(No Model.)
G. JOHNSTON.
TRIAL SPECTACLE FRAME.
No. 444,495. Patented Jan. 13, 1891.
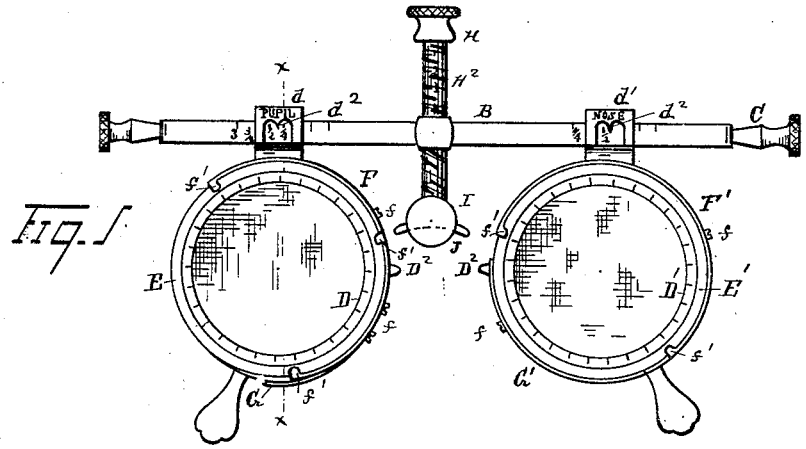
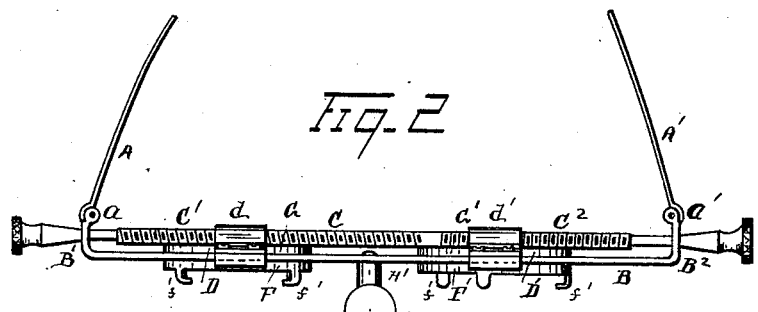
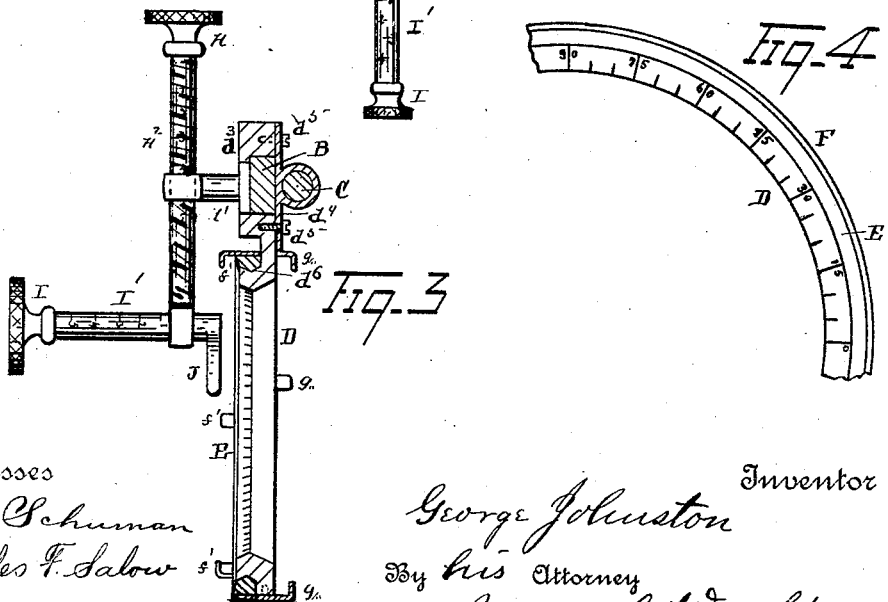
Witnesses
John Schuman
Charles F. Salow
Inventor
George Johnston
By his Attorney
Newell S. Wright

UNITED STATES PATENT OFFICE.

GEORGE JOHNSTON, OF DETROIT, MICHIGAN.

TRIAL SPECTACLE-FRAME.

SPECIFICATION forming part of Letters Patent No. 444,495, dated January 13, 1891.

Application filed May 31, 1890. Serial No. 353,711. (No model.)

*To all whom it may concern:*

Be it known that I, GEORGE JOHNSTON, a citizen of the United States, residing at Detroit, county of Wayne, State of Michigan, have invented a certain new and useful Improvement in Trial Spectacle-Frames; and I declare the following to be a full, clear, and exact description of the invention, such as will enable others skilled in the art to which it appertains to make and use the same, reference being had to the accompanying drawings, which form a part of this specification.

My invention relates to certain new and useful improvements in trial spectacle - frames for fitting optical lenses; and it consists of the devices and appliances and their combinations and arrangements, as hereinafter specified and claimed, and illustrated in the accompanying drawings, in which—

Figure 1 is a front elevation. Fig. 2 is a plan view. Fig. 3 is a cross-section through one of the bows and its connected devices on the line $xx$, Fig. 1. Fig. 4 is an enlarged view of a portion of the device showing the degree-marks and scale.

I carry out my invention as follows: A A' represent the temples united by the connecting-bar B. This bar I contemplate making in a single piece bent at its extremities, as shown at B' and B$^2$, the temples being jointed directly to said extremities, as shown at $a\,a'$, without any intermediate connecting arms or pieces, as has heretofore been common, fastened to said bar. I also unite the temples with said bar B upon a line therewith, as shown, instead of to a depending intermediate connecting arm common in other devices of this class. The flanged extremities B' and B$^2$ are perforated to permit the engagement therein of the adjusting-screw C, provided with right and left screw-threads, as shown at C' and C$^2$.

D and D' represent the sliding bows provided with sliding bearings $d$ and $d'$, engaging the bar B to slide thereupon, said bearings also having a screw - threaded engagement with the adjusting-screw C, whereby the same are moved to and fro upon the bar. Said bar is provided with the usual scales at each side the center. I prefer to construct the front face of the sliding bearings open, as illustrated in the drawings, so that the scale can be seen in said open face, the same being also provided with an index point $d^2$ centrally located. I also prefer to make said sliding bearings in two parts $d^3$ and $d^4$, properly united upon the bar, as by screws $d^5$, the part $d^3$ being recessed to receive the bar, the part $d^4$ being screw-tapped to receive the adjusting-screw. In this manner of construction said bearings can be engaged in place without disconnecting the temples from the bar. The bearings can also be made cheaper as well as put together upon the bar and screw in a readier and more convenient manner.

E and E' represent the rotatable bows having a rotatable connection with the bows D D' in any suitable manner, the bows D and D', respectively, being preferably channeled on the outer periphery to receive the rotatable bow, as shown at $d^6$. The inner portion of each of the bows D D', I prefer to project thus, outward toward the outer face of the rotatable bows and within said rotatable bows, the inward projecting face of the bows D D' being respectively provided with a scale, as shown. Having the scale on the inside of the rotatable bow instead of outside, as heretofore common, renders the device less clumsy in appearance, the same being more compact. I also prefer to offset the sliding bearings, so that their front faces will be substantially on a plane with the front face of the rotatable bows. F and F' denote springs for holding the trial-lenses in place, said springs located by my invention preferably on the outside of the rotating bows and secured thereto in any proper manner, as by screws $f$. The springs are each provided with retaining-fingers, as shown at $f'$, for engaging the trial-lens. Similar springs may also be engaged upon the outer peripheries of the bows D D', as shown at G G', the same being in like manner provided with retaining-fingers $g$. This arrangement of the springs also makes the device more compact and neater in appearance. The bows D and D' are also each preferably provided with a point D$^2$ to project each side of the nose. By moving the adjusting-screw C the device will register the width of the nose when said points come into contact therewith, the width being registered upon the bar B. To get the pupillary distance the bows D D' are adjusted until both pupils are centered before the holes in the lenses.

H is a vertical screw supported in any suitable manner by a center-piece H', either within a case H² or said case may be omitted, the end of the center-piece being screw-tapped to receive the screw, the opposite end of the piece being engaged with the bar B. At the lower end the screw H carries a laterally-extended screw I, which in turn carries a nose-piece J. By turning the vertical screw H up or down the height of the bridge required can be readily ascertained. By moving the screw I the nose-piece J is carried in or out to determine how much the nose-piece or bridge of the glasses should be set in or out. By providing the screw H with a case sleeved through the center-piece and provided with a scale thereupon, as shown, the required height of the bridge can be readily registered upon said scale. So, also, by providing the screw I with a case I', sleeved through the lower end of the case H², having a scale thereon, as shown, the required location of the bridge out or in can also be readily registered on said scale.

Together with the scale marked inside of the rotatable bow I also provide the device with degrees marked adjacent to the scale, the scale and degree marks forming an index. To this end the inner face of the sliding bow may be beveled to receive the scale-marks, the annular surrounding surface being provided with the proper degree-marks suitably arranged in connection with the scale. Cylindrical test-lenses are marked with a line at the axis. In turning the rotatable bow until the line on the glass coincides with the line on the scale the operator can look through the glass, thereby getting the two in line more readily and being able to read the degree directly through the line.

What I claim as my invention is—

1. In combination with the temples, a connecting-bar made of a single continuous piece having a direct jointed engagement at its extremities with said temples, substantially as set forth.

2. In combination with the temples, a connecting-bar made of a single continuous piece bent rearward at its extremities, said temples having a jointed engagement with said extremities substantially on the same plane as the bar, as set forth.

3. In combination with the bar having a direct connection with the temples, a vertically-adjustable nose-piece, substantially as set forth.

4. In combination, the bar having a direct connection with the temples, a vertically-adjustable nose-piece, and a scale to register the adjustment of the nose-piece, substantially as set forth.

5. In combination, the bar having a direct connection with the temples and a vertically and horizontally adjustable nose-piece, substantially as set forth.

6. In combination, the bar connecting the temples, the operating-screw, and the sliding bows provided with sliding bearings engaging said bows upon said bar and said screw, said bearings made in two separate pieces united, substantially as set forth.

7. In combination, the indexed bar having a direct connection with the temples, and the sliding bows provided with sliding bearings engaging said bar, the front face of said bearings cut away to disclose the index upon said bar, substantially as set forth.

8. In combination, the bar connecting the temples and sliding bows engaged upon said bar, said bows provided with inwardly-projecting points, substantially as set forth.

9. In combination, a laterally-movable bow and a rotatable bow connected thereupon, the one provided with an index located within the other, substantially as set forth.

10. In combination with a bow, a spring located upon the outer periphery thereof, substantially as set forth.

11. In combination, the laterally-sliding bow, the rotatable bow connected thereupon, and the sliding bow provided with a sliding bearing which is offset to bring the front face of the sliding bow on a plane with the front face of the revolving bow, substantially as set forth.

12. In combination, the bar having a direct connection with the temples and a horizontally-adjustable nose-piece, substantially as set forth.

13. In combination, the bar connecting the temples, a vertically-operating screw carrying a nose-piece at its base, and an arm connected with said bar through which the said screw works, substantially as set forth.

In testimony whereof I sign this specification in the presence of two witnesses.

GEORGE JOHNSTON.

Witnesses:
N. S. WRIGHT,
JOHN F. MILLER.